(12) United States Patent
Watanabe et al.

(10) Patent No.: US 9,327,658 B2
(45) Date of Patent: May 3, 2016

(54) POWER CONVERSION DEVICE IN ELECTRIC VEHICLE

(71) Applicant: HONDA MOTOR CO., LTD., Tokyo (JP)

(72) Inventors: Yasuto Watanabe, Wako (JP); Mitsuaki Hirakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 512 days.

(21) Appl. No.: 13/900,713

(22) Filed: May 23, 2013

(65) Prior Publication Data

US 2014/0001838 A1    Jan. 2, 2014

(30) Foreign Application Priority Data

Jun. 29, 2012  (JP) .................................. 2012-147697

(51) Int. Cl.
| | |
|---|---|
| *B60L 1/00* | (2006.01) |
| *B60R 16/02* | (2006.01) |
| *B60L 11/00* | (2006.01) |
| *H02M 1/32* | (2007.01) |

(52) U.S. Cl.
CPC .............. *B60R 16/02* (2013.01); *B60L 11/005* (2013.01); *B60L 2210/10* (2013.01); *H02M 2001/325* (2013.01); *Y02T 10/7022* (2013.01); *Y02T 10/7216* (2013.01)

(58) Field of Classification Search
CPC ............................. B60R 16/02; B60L 11/005
See application file for complete search history.

(56) References Cited

U.S. PATENT DOCUMENTS

| | | | |
|---|---|---|---|
| 2008/0238383 A1 | 10/2008 | Watanabe et al. | |
| 2010/0134940 A1* | 6/2010 | Nguyen | H01G 2/08 361/91.1 |
| 2011/0133677 A1* | 6/2011 | Franke | B60L 11/1887 318/400.3 |
| 2015/0048796 A1* | 2/2015 | Sherstyuk | H01M 10/425 320/129 |
| 2015/0069830 A1* | 3/2015 | Huang | H02H 7/18 307/9.1 |
| 2015/0263626 A1* | 9/2015 | Mao | H02M 3/1588 361/782 |

FOREIGN PATENT DOCUMENTS

| | | |
|---|---|---|
| CN | 2453568 Y | 10/2001 |
| JP | 2006-33966 A | 2/2006 |

* cited by examiner

*Primary Examiner* — Daniel Cavallari
(74) *Attorney, Agent, or Firm* — Birch, Stewart, Kolasch & Birch, LLP

(57) ABSTRACT

A power conversion device in an electric vehicle that uses a short-circuit capacitor and is capable of detecting a short circuit of the capacitor by using a simple structure. The power conversion device includes an inductor connected on a main battery side with a switching member provided between the inductor and a power line. The power line connects a first capacitor and a second capacitor as well as an electric load in parallel. A controller is provided for controlling the on/off of the switching member. The first capacitor and the second capacitor are each a small capacitor configured to be short-circuited upon application of an excess voltage. The power conversion device is provided with a detection member for detecting a short circuit of any one of the first capacitor and the second capacitor. The detection member is connected in series to the first capacitor and the second capacitor.

20 Claims, 18 Drawing Sheets

POWER CONVERSION DEVICE IN ELECTRIC VEHICLE

CROSS-REFERENCE TO RELATED APPLICATIONS

The present application claims priority under 35 USC 119 to Japanese Patent Application No. 2012-147697 filed Jun. 29, 2012 the entire contents of which are hereby incorporated by reference.

BACKGROUND OF THE INVENTION

1. Field of the Invention

The present invention relates to a power conversion device in an electric vehicle wherein the device uses a short-circuit capacitor.

2. Description of Background Art

A DC/DC converter as a power conversion device used in an electric vehicle is described in Japanese Patent Application Publication No. 2006-33966 wherein an inductor is connected in series to a battery. Switching elements are connected in series to the inductor and a capacitor and a load are connected in parallel to the switching elements.

In a DC/DC converter where an electrolytic capacitor or a film which withstands high voltage is used between a positive power line and a negative power line, even when an excess voltage or the like is applied to the electrolytic capacitor or the film, the positive power line and the negative power line are never short-circuited because the circuit between the electrodes is open. However, being large in size and requiring high costs, the electrolytic capacitor or the film is not suitable for a small electric vehicle such as an electric motorcycle.

In contrast, a ceramic capacitor being small in size and having excellent ripple characteristics can be considered suitable for use in a small electric vehicle. However, in such a case, a voltage detector or the like needs to be additionally provided to detect a short circuit caused upon application of an excess voltage or the like, and this increases the number of components and thus increases the costs.

SUMMARY AND OBJECTS OF THE INVENTION

Accordingly, an embodiment of the present invention has an objective of providing a power conversion device in an electric vehicle, which uses a short-circuit capacitor and is capable of detecting a short circuit of the capacitor by using a simple structure.

A power conversion device (100) in an electric vehicle (10) according to an embodiment of the present invention has the following aspects.

According to an embodiment of the present invention, a power conversion device (100) that includes an inductor (L) connected on a battery (18) side; switching means (104) provided between the inductor (L) and a power line (102); the power line (102) connecting a capacitor (C1, C2) and an electric load (R) in parallel; and control means (112) for controlling on/off of the switching means (104) so as to step up power from the battery (18) and supply the power to the electric load (R) or so as to step down power from the electric load (R) and supply the power to the battery (18). The capacitor (C1, C2) is a small capacitor configured to be short-circuited upon application of an excess voltage. The power conversion device (100) further includes informing means (106) for notifying a short circuit of the capacitor (C1, C2). The informing means is connected in series to the capacitor (C1, C2).

According to an embodiment of the present invention, the informing means (106) includes light-emitting means (122a) for emitting light when the capacitor (C1, C2) is short-circuited. Light-receiving means (122b) are provided for receiving the light emitted by the light-emitting means (122a).

According to an embodiment of the present invention, the light-emitting means (122a) and the light-receiving means (122b) are configured by a photocoupler (122).

According to an embodiment of the present invention, the control means (112) receives light-emission information from the light-emitting means (122a).

According to an embodiment of the present invention, the informing means (106) has a diode bridge circuit (120), and the light-emitting means (122a) is connected in series to the capacitor (C1, C2) via the diode bridge circuit (120).

According to an embodiment of the present invention, the control means (112) stops stepping up or stepping down the power when informed by the informing means (106) that the capacitor (C1, C2) is short-circuited.

According to an embodiment of the present invention, the power conversion device is provided with the informing means for informing of a short circuit of the capacitor. The informing means is connected in series to the capacitor. Accordingly, even when a small short-circuit capacitor is used, in the event of a short circuit, a closed circuit is formed between the power lines by the capacitor and the detection means to allow the detection means to inform of the short-circuit. Therefore, a special member such as a voltage detector is unnecessary. Thus, a power conversion device suitable for a small electric vehicle can be provided.

According to an embodiment of the present invention, the informing means has the light-emitting means for emitting light when the capacitor is short-circuited and light-receiving means for receiving the light emitted by the light-emitting means. Accordingly, the light-emitting means and the light-receiving means can be grounded separately.

According to an embodiment of the present invention, the light-emitting means and the light-receiving means are configured by the photocoupler. Accordingly, the informing means can be configured inexpensively.

According to an embodiment of the present invention, the control means receives light-emission information from the light-emitting means. Accordingly, the control means which is a low-voltage system and the circuit which is a high-voltage system can be grounded separately.

According to an embodiment of the present invention, the informing means has a diode bridge circuit, and the light-emitting means is connected in series to the capacitor via the diode bridge circuit. Accordingly, even when the power conversion device includes multiple capacitors, the informing means can inform of a short circuit for each capacitor.

According to an embodiment of the present invention, when informed by the informing means that the capacitor is short-circuited, the control means stops stepping up or stepping down the power, but the power can pass in both directions. Accordingly, a minimum necessary voltage can be supplied to the electric load. Thus, a limp home mode can be performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A power conversion device in an electric vehicle according to the invention is described in detail below with reference to the attached drawings, by use of a preferred embodiment.

Figure 1:
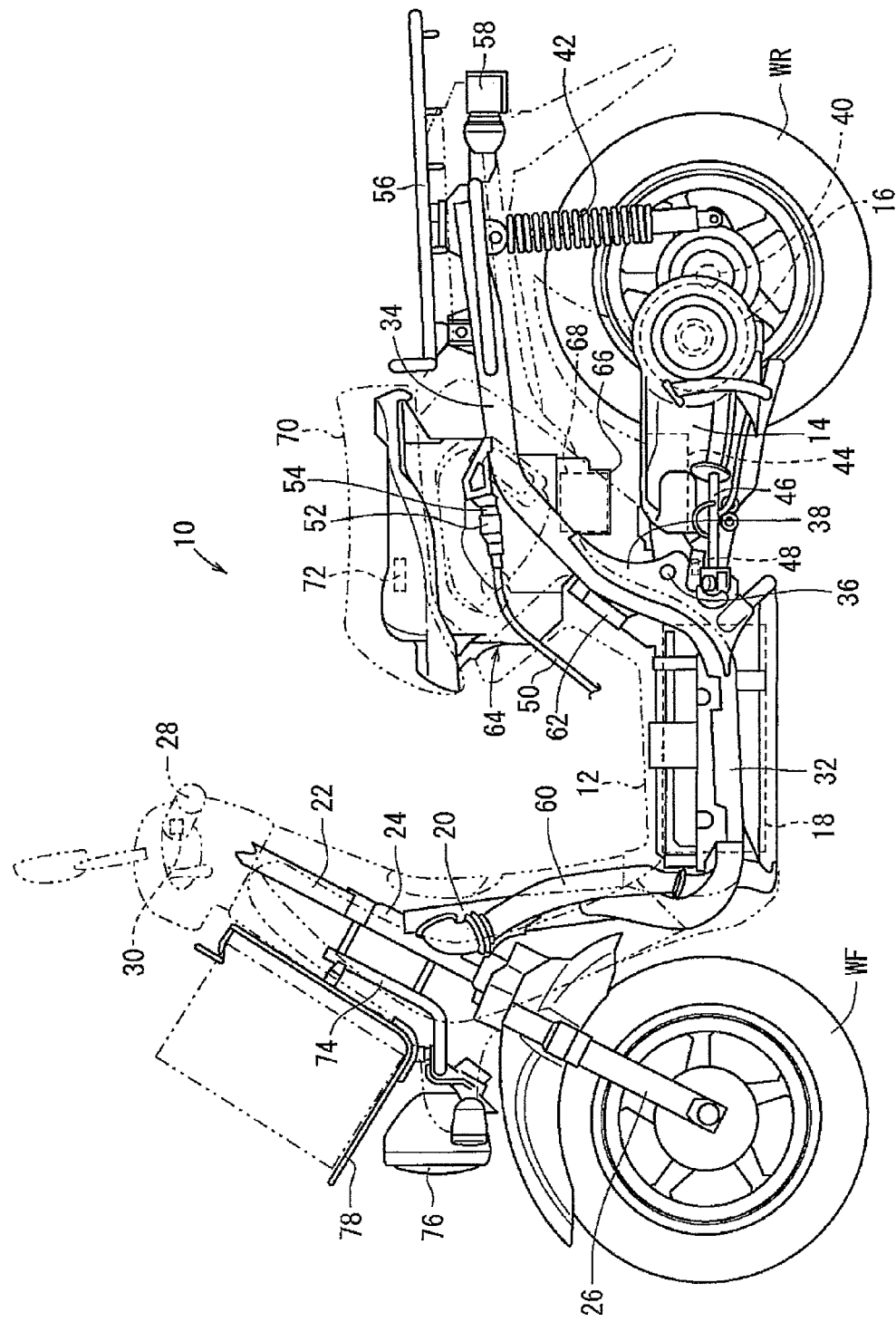
FIG. 1 is a left-side view of an electric motorcycle equipped with a power conversion device.

FIG. 1 is a left-side view of an electric motorcycle equipped with a power conversion device. An electric motorcycle (electric vehicle) 10 is a scooter-type motorcycle having a step floor 12. A rear wheel WR is driven by a rotary driving force of a motor 16 provided on a swingarm 14. A high-voltage (e.g., 72 V) main battery (battery) 18 configured to supply power to the motor 16 has multiple battery modules each formed by multiple battery cells connected in series.

A head pipe 24 is coupled to an upper end portion of a main frame 20 and supports a steering stem 22 while allowing it to pivot and rotate. Paired left and right front forks 26 are attached to the steering stem 22 and support a front wheel WF while allowing it to pivot and rotate. The front wheel WF can be steered by a steering handle 28 that has an accelerator grip and is attached to an upper portion of the steering stem 22. The steering handle 28 is provided with a throttle sensor 30 configured to detect the rotation angle of the accelerator grip, i.e., an accelerator position.

Paired left and right side frames 32 are joined to a lower portion of the main frame 20 and extend toward the rear of the vehicle body. A rear frame 34 is joined to each of the paired left and right side frames 32 and extends toward the rear of the vehicle body and upward. The main battery 18 is provided below the step floor 12 and between the paired left and right side frames 32. A pivot plate 38 in which a swingarm pivot 36 is formed is attached to a rear portion of the side frame 32. In the swingarm pivot 36, the swingarm 14 is pivotally and swingably supported at its front end portion, the swingarm 14 being a one-sided swingarm that supports the rear wheel WR only with its arm on the left side in a vehicle width direction. The rear wheel WR is pivotally and rotatably supported by a rear end portion of the swingarm 14 via an axle 40, and the rear end portion of the swingarm 14 is suspended from the rear frame 34 by a rear suspension 42.

A PDU (power drive unit) 44 is provided on the swingarm 14, and is configured to convert a direct current supplied from the main battery 18 into an alternate current and supply it to the motor 16. A sidestand 46 is provided on the pivot plate 38, the sidestand 46 having a sidestand switch 48 configured to output a detection signal when the sidestand 46 is up at its predetermined retraction position.

A charger plug 52 of a charger cable 50 extending from a charger (not shown) configured to charge the main battery 18 can be coupled to a charger socket 54 provided on an upper portion of the rear frame 34. A rear carrier 56 and a taillight 58 are provided on the rear frame 34.

An air introduction pipe 60 is joined to a front portion of the main battery 18, and an air intake fan 62 is provided on a rear portion of the main battery 18. By the air intake fan 62, air is introduced from the air introduction pipe 60 into the main battery 18 and is discharged to the rear of the vehicle body. Thereby, heat generated by the main battery 18 can be cooled by outside air.

A trunk 64 is provided between the paired left and right rear frames 34. A trunk bottom 66 projecting downwardly from the trunk 64 houses therein a sub-battery 68 of low voltage (e.g., 12V) charged by the main battery 18 or by the charger described earlier. A seat 70 is provided above the trunk 64, and also functions as a lid of the trunk 64. The seat 70 is provided with a seat switch 72 configured to be actuated and output a seat signal when a driver sits on the seat 70.

A bracket 74 is coupled to a front portion of the head pipe 24, and a headlight 76 is attached to a front end portion of this bracket 74. A front carrier 78 is provided above the headlight 76 and supported by the bracket 74.

Figure 2:
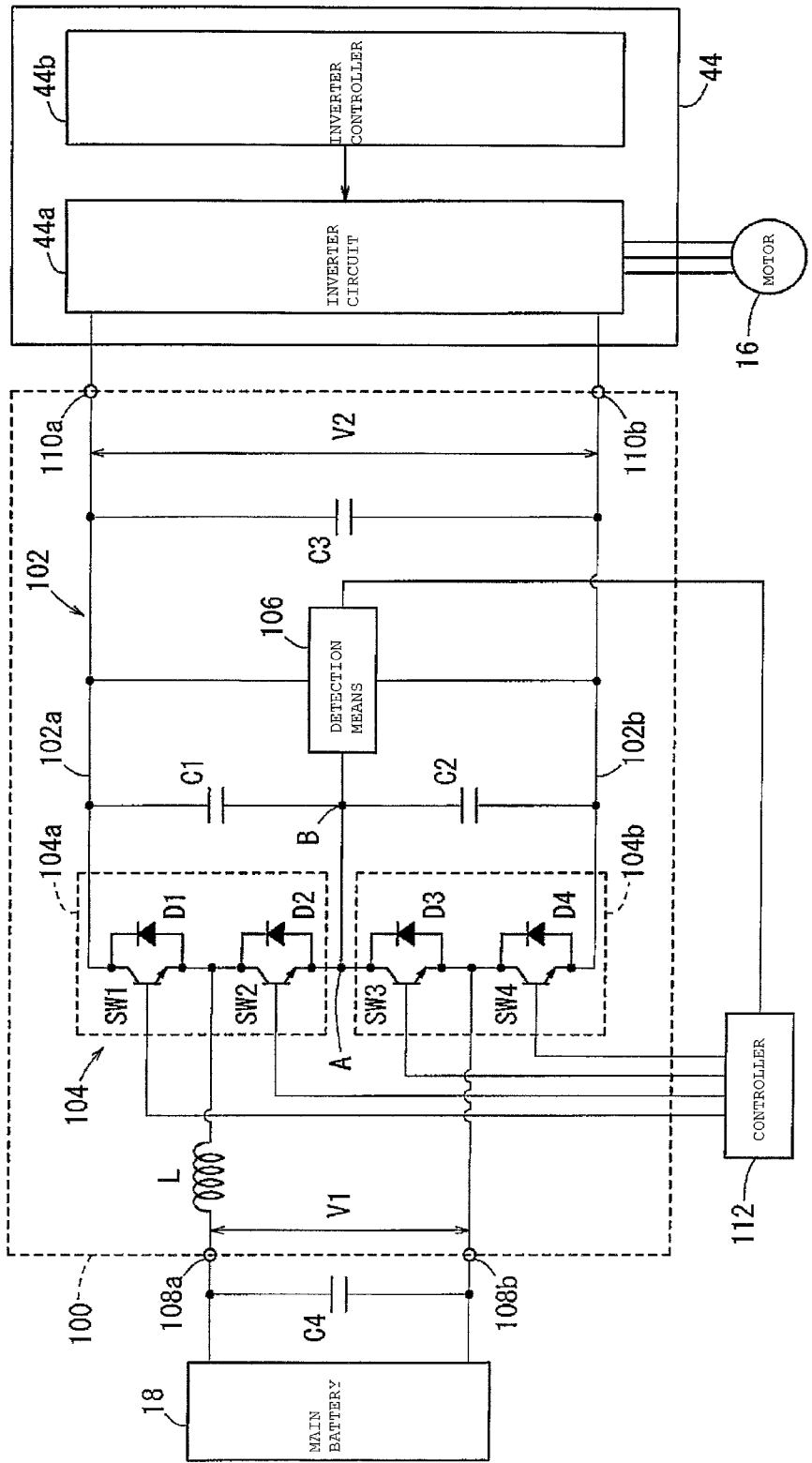
FIG. 2 is a circuit diagram of the power conversion device installed in the electric motorcycle.

FIG. 2 is a circuit diagram of the power conversion device (DC/DC converter) installed in the electric motorcycle 10. A power conversion device 100 is configured to step up a voltage from the main battery 18 and supply the voltage to an inverter circuit 44a of the PDU 44, or to step down a voltage from the inverter circuit 44a or the like of the PDU 44 and supply the voltage to the main battery 18. The power conversion device 100 includes an inductor L connected on the main battery 18 side and connected in series to the main battery 18; a power line 102 that connects a first capacitor C1 and a second capacitor C2 connected in series, a third capacitor C3, and the inverter circuit 44a in parallel; switching means 104 provided between the inductor L and the power line 102; and detection means (informing means) 106 connected in series to the first capacitor C1 and the second capacitor C2 and configured to detect (and inform of) a short circuit of the first capacitor C1 and the second capacitor C2. A detailed description of the detection means 106 will be given later.

The inductor L is configured to accumulate magnetic energy during a step-up operation or a step-down operation, and is connected to a positive-side input portion 108a of the power conversion device 100. The switching means 104 includes a first switching portion 104a and a second switching portion 104b each having a pair of switching elements such as IGBTs. The first switching portion 104a is connected to the positive-side input portion 108a via the inductor L, and the second switching portion 104b is connected to a negative-side input portion 108b of the power conversion device 100. A voltage between the positive-side input portion 108a and the negative-side input portion 108b (an input voltage) is denoted as V1.

Note that the positive-side input portion 108a is connected to the positive terminal of the main battery 18, and the negative-side input portion 108b is connected to the negative terminal of the main battery 18. In addition, a smoothing capacitor C4 is provided to lower the impedance of the main battery 18. For example, when the main battery 18 moves away from the power conversion device 100 to elongate the power cabling, the impedance of the main battery 18 increases to result in control malfunction. The smoothing capacitor C4 prevents this.

The first switching portion 104a and the second switching portion 104b are connected in series. The first switching portion 104a is connected to a positive line 102a of the power line 102, and the second switching portion 104b is connected to a negative line 102b of the power line 102. Note that a positive-side output portion 110a of the positive line 102a is connected to the positive terminal of the inverter circuit 44a of the PDU 44, and a negative-side output portion 110b of the positive line 102b is connected to the negative terminal of the inverter circuit 44a of the PDU 44. A voltage between the positive-side output portion 110a and the negative-side output portion 110b (an output voltage) is denoted as V2.

The first switching portion 104a and the second switching portion 104b connected in series and the first capacitor C1 and the second capacitor C2 connected in series are connected in parallel to each other. Connection node A between the first switching portion 104a and the second switching portion 104b is connected to connection node B between the first capacitor C1 and the second capacitor C2.

The first switching portion 104a includes a first switching element SW1 and a second switching element SW2 connected in series; and a first flywheel diode D1 and a second flywheel diode D2 connected in parallel to the first switching element SW1 and the second switching element SW2, respectively. The second switching portion 104b includes a third switching element SW3 and a fourth switching element SW4 connected in series; and a third flywheel diode D3 and a fourth flywheel diode D4 connected in parallel to the third switching element SW3 and the fourth switching element SW4, respectively. The first switching element SW1 to the fourth switching element SW4 are connected to one another in series.

The first switching element SW1 is a switching element for connecting the positive terminal of the main battery 18, i.e., the inductor L, to the positive terminal of the first capacitor C1 and to the positive line 102a, and the second switching element SW2 is a switching element for connecting the positive terminal of the main battery 18, i.e., the inductor L, to the negative terminal of the first capacitor C1 and the positive terminal of the second capacitor C2, i.e., the connection node B.

The third switching element SW3 is a switching element for connecting the negative terminal of the main battery 18 to the negative terminal of the first capacitor C1 and the positive terminal of the second capacitor C2, i.e., the connection node B, and the fourth switching element SW4 is a switching element for connecting the negative terminal of the main battery 18 to the negative terminal of the second capacitor C2 and to the negative line 102b. Note that the second switching element SW2 and the third switching element SW3 are connected to each other at the connection node A.

The first capacitor C1, the second capacitor C2, and the third capacitor C3 are configured by small capacitors, e.g., ceramic capacitors that are short-circuited upon application of an excess voltage, and repeat charge and discharge through on and off switching of the first switching element SW1 to the fourth switching element SW4.

An inverter controller 44b of the PDU 44 controls the drive of a switching element (not shown) of the inverter circuit 44a to convert a direct voltage applied to the inverter circuit 44a into an alternate voltage of three phases (U, V, and W phases) and supply the alternate voltage to the motor 16 which is thereby driven. The inverter controller 44b controls the drive of the switching element of the inverter circuit 44a to convert a regenerative alternate voltage generated by the motor 16 into a direct voltage and supply the direct voltage to the power conversion device 100.

A controller (control means) 112 controls the on/off of the first switching element SW1 to the fourth switching element SW4 according to an operation mode being set. The operation mode includes a step-up operation, a step-down operation, and a pass-through operation. A description is given below of these operations.

First, the step-up operation is described. In the step-up operation, the power conversion device 100 steps up a voltage from the main battery 18 by alternately charging the first capacitor C1 and the second capacitor C2 and causing the inductor L to accumulate magnetic energy.

In the step-up operation, with the first switching element SW1 and the fourth switching element SW4 being constantly off, the controller 112 applies a gate voltage to the second switching element SW2 and the third switching element SW3 such that the second switching element SW2 and the third switching element SW3 are alternately turned on and off.

Figure 3A:
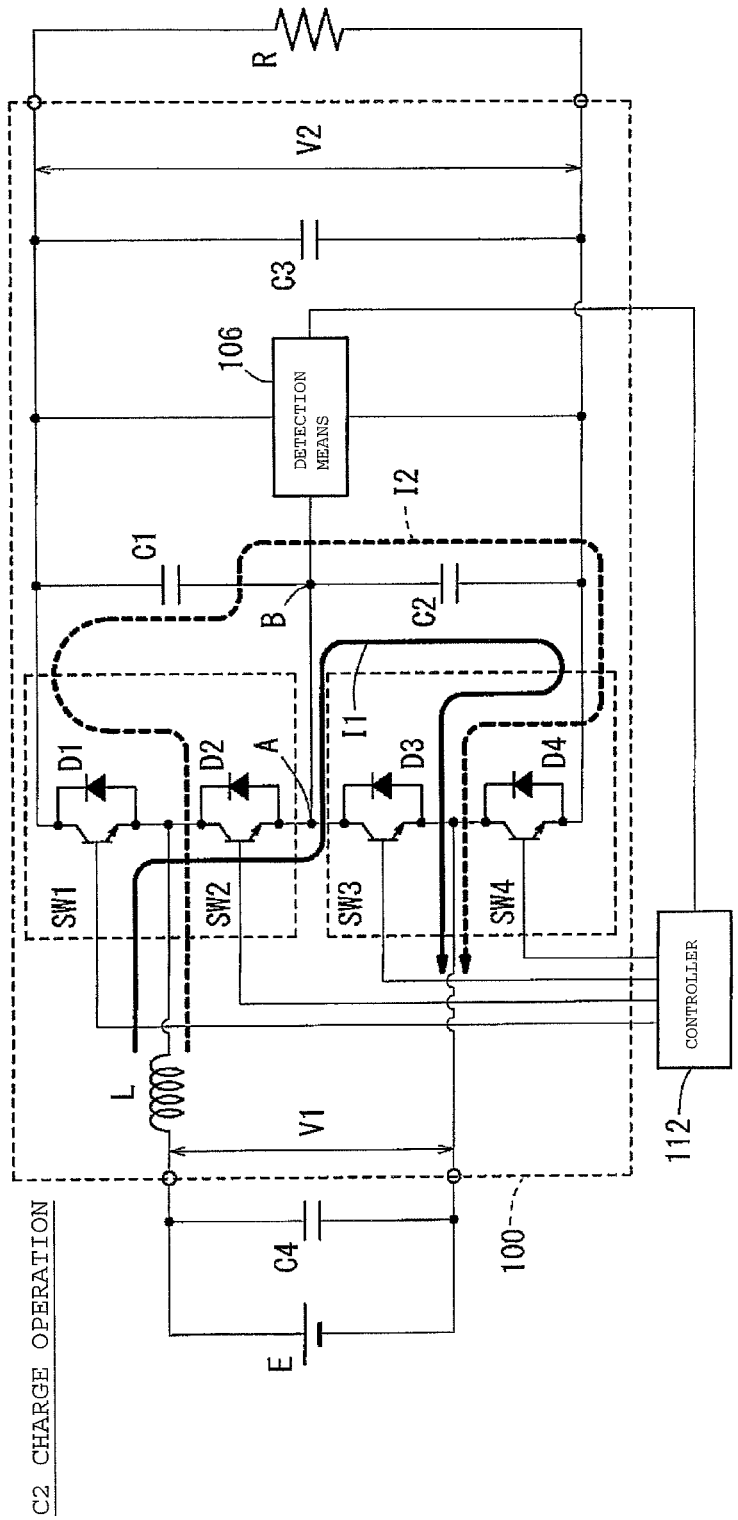
FIG. 3A shows how a current flows when a second capacitor is charged.
Figure 3B:
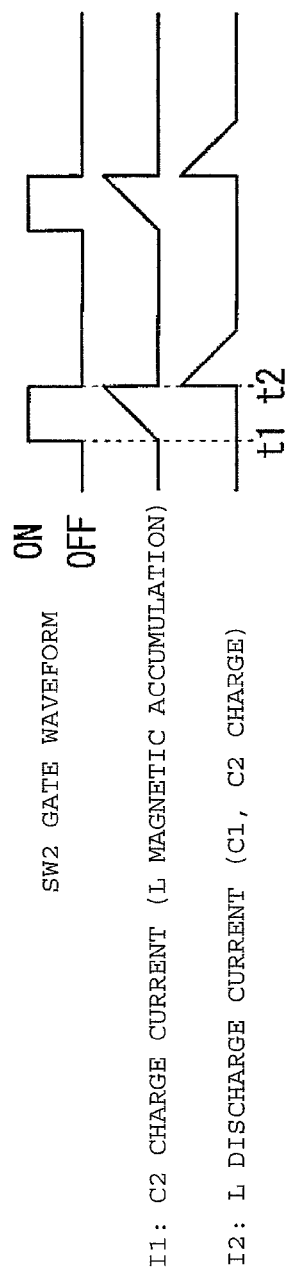
FIG. 3B shows the waveform of the current flowing when the second capacitor is charged.

First, an operation of charging the second capacitor C2 is described. FIG. 3A shows how a current flows when the second capacitor C2 is charged. FIG. 3B shows the waveform of the current flowing when the second capacitor C2 is charged. Note that FIG. 3A shows the main battery 18 as a power source E with an electric load of the inverter circuit 44a and the motor 16 on the output side as R.

At time t1, the controller 112 applies a gate voltage to the second switching element SW2 of the first switching portion 104a to turn the second switching element SW2 on (with the first switching element SW1, the third switching element SW3, and the fourth switching element SW4 being off). Then, a charge current I1 flows the following route the power source E->the inductor L->the second switching element SW2->the second capacitor C2->the fourth flywheel diode D4->the power source E. In this event, the second capacitor C2 is charged by the power source E, and the inductor L accumulates magnetic energy (see I1: WAVEFORM OF C2 CHARGE CURRENT in FIG. 3B). Since the first capacitor C1 and the second capacitor C2 are also connected to the third capacitor C3 and the electric load R, the third capacitor C3 is charged at the same time, and an output current flows through the electric load R.

Thereafter, at time t2, the controller 112 stops applying the gate voltage to the second switching element SW2 to turn the second switching element SW2 off (with the first switching element SW1, the third switching element SW3, and the fourth switching element SW4 also being off). Then, a discharge current I2 by the magnetic energy accumulated in the inductor L flows the following route: the inductor L->the first flywheel diode D1->the first capacitor C1->the second capacitor C2->the fourth flywheel diode D4->the power source E->the inductor L (see I2: WAVEFORM OF L DISCHARGE CURRENT in FIG. 3B).

Figure 4A:
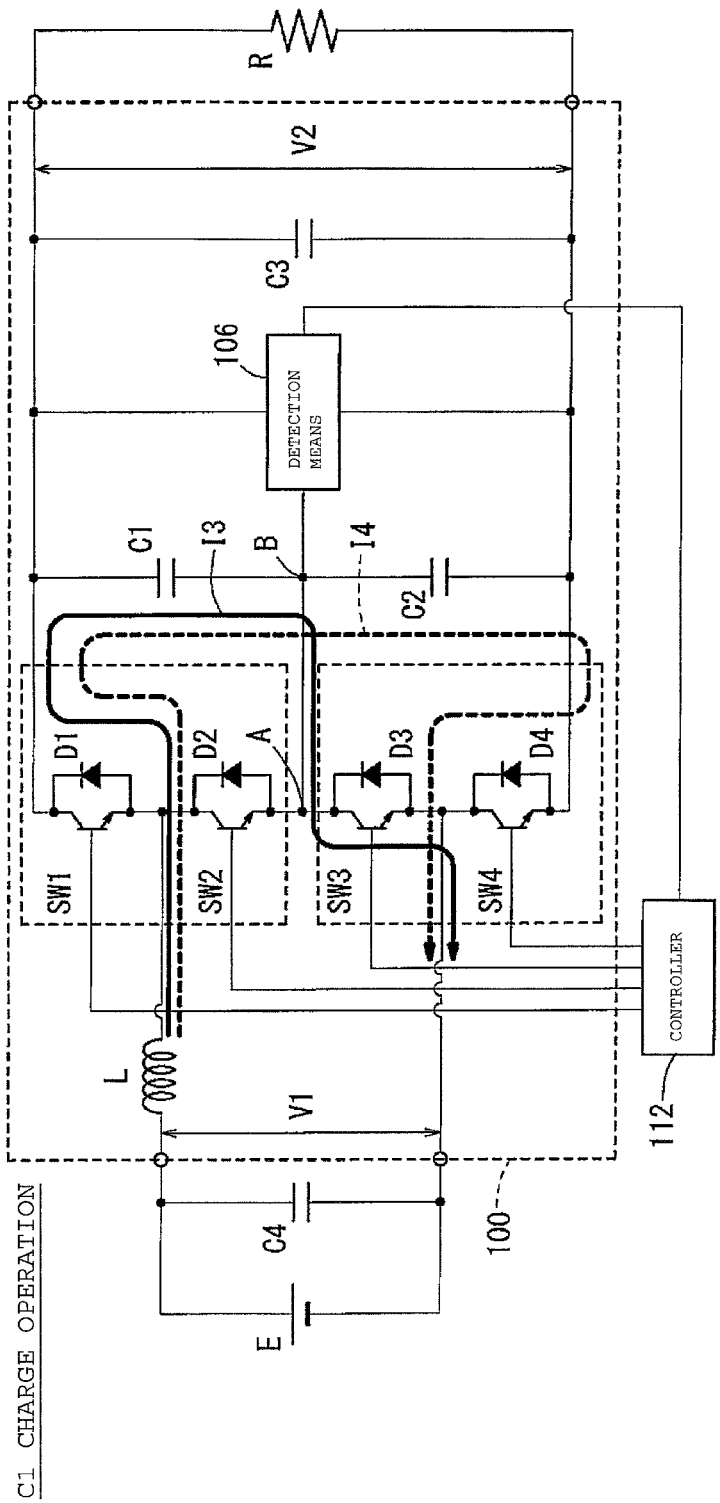
FIG. 4A shows how a current flows when a first capacitor is charged.
Figure 4B:
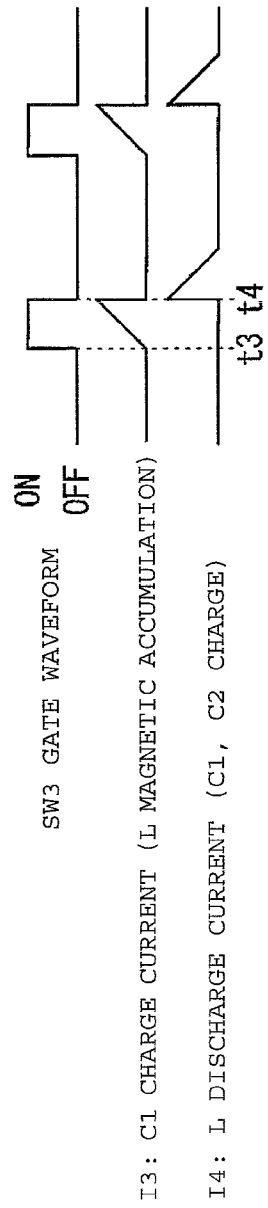
FIG. 4B shows the waveform of the current flowing when the first capacitor is charged.

Next, an operation of charging the first capacitor C1 is described. FIG. 4A shows how a current flows when the first capacitor C1 is charged. FIG. 4B shows the waveform of the current flowing when the first capacitor C1 is charged. Note that, like FIG. 3A, FIG. 4A shows the main battery 18 as a power source E with an electric load of the inverter circuit 44a and the motor 16 on the output side as R.

At time t3, the controller 112 applies a gate voltage to the third switching element SW3 of the second switching portion 104b to turn the third switching element SW3 on (with the first switching element SW1, the second switching element SW2, and the fourth switching element SW4 being off). Then, a charge current I3 flows the following route: the power source E->the inductor L->the first flywheel diode D1->the first capacitor C1->the third switching element SW3->the power source E. In this event, the first capacitor C1 is charged by the power source E, and the inductor L accumulates magnetic energy (see I3: WAVEFORM OF C1 CHARGE CURRENT in FIG. 4B). Since the first capacitor C1 and the second capacitor C2 are also connected to the third capacitor C3 and the electric load R, the third capacitor C3 is charged at the same time, and an output current flows through the electric load R.

Thereafter, at time t4, the controller 112 stops applying the gate voltage to the third switching element SW3 to turn the third switching element SW3 off (with the first switching element SW1, the second switching element SW2, and the fourth switching element SW4 also being off). Then, a discharge current I4 by the magnetic energy accumulated in the inductor L flows the following route: the inductor L->the first flywheel diode D1->the first capacitor C1->the second capacitor C2->the fourth flywheel diode D4->the power source E->the inductor L (see I4: WAVEFORM OF L DISCHARGE CURRENT in FIG. 4B).

In this way, the power conversion device 100 can perform the step-up operation by alternately passing the charge currents I1 and I3 from the power source E to the two series-connected first capacitor C1 and second capacitor C2 and by making the inductor L accumulate the magnetic energy with the charge currents I1, I3 which are applied to the first capacitor C1 and the second capacitor C2 and charge the first capacitor C1 and the second capacitor C2 with the discharge currents I2, I4 from the inductor L.

The power conversion device 100 can output a voltage obtained by stepping up the input voltage of the power source E by one to two times, by changing the duty ratio of the turnon time of the second switching element SW2 and the third switching element SW3 between 0% to 50% (actually, the value is equal to or lower than 50%, such as 45%, in consideration of the dead time for prevention of a short circuit between the second switching element SW2 and the third switching element SW3). Stated differently, the power conversion device 100 can continuously change the output voltage to any value by changing the duty ratio to control (adjust) the charge currents I1, I3 from the power source E to the first capacitor C1 and the second capacitor C2 as well as the discharge currents I2, I4 by the inductor L.

Next, the step-down operation is described. The motor 16 is used as an electric load on the output side. When the output-side voltage is increased through control of the revolutions of the motor 16 to decrease the speed thereof (or through a regeneration braking operation), the output-side voltage can be stepped down through the step-down operation to charge the main battery 18 on the input side.

When the step-down ratio is high, i.e., when the ratio of a regenerative voltage to a voltage applied to the main battery 18 is, for example, about "1:0.5" to "1:0.8" and the regenerative voltage is thus large, the power conversion device 100 steps down the voltage by alternately discharging the first capacitor C1 and the second capacitor C2. When the step-down ratio is low, i.e., when the ratio of a regenerative voltage to a voltage applied to the main battery 18 is, for example, about "1:0.8" to "1:1" and the regenerative voltage is thus small, the power conversion device 100 steps down the voltage by simultaneously discharging the first capacitor C1 and the second capacitor C2. Note that the first capacitor C1 and the second capacitor C2 are charged by regenerative voltages.

In the step-down operation performed when the step-down ratio is high, with the second switching element SW2 and the third switching element SW3 being constantly off, the controller 112 applies a gate voltage to the first switching element SW1 and the fourth switching element SW4 such that the first switching element SW1 and the fourth switching element SW4 are alternately turned on and off.

Figure 5A:
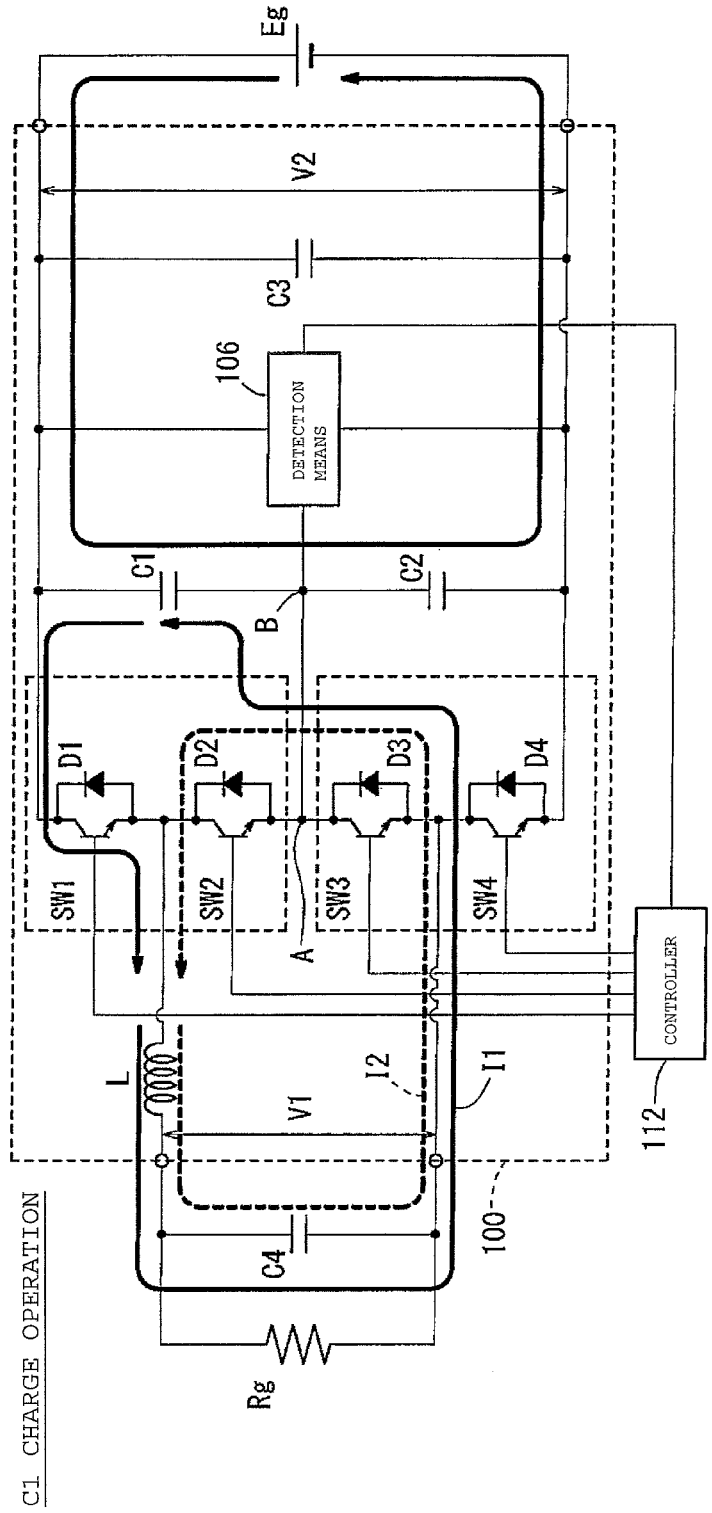
FIG. 5A shows how a current flows when the first capacitor is discharged.
Figure 5B:
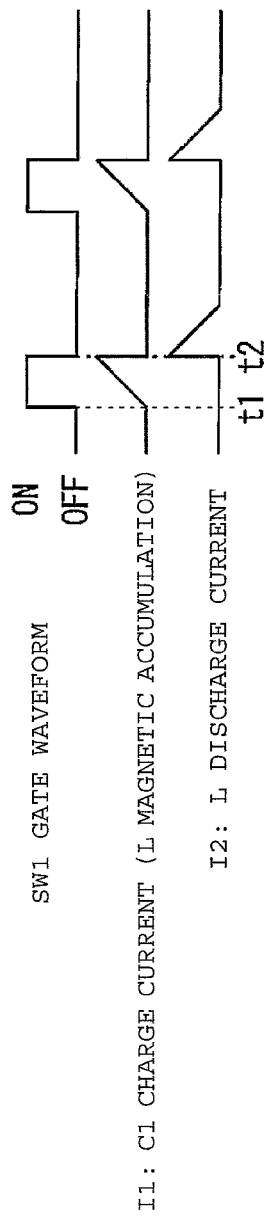
FIG. 5B shows the waveform of the current flowing when the first capacitor is discharged.

First, a description is given of an operation of discharging the first capacitor C1 when the step-down ratio is high. FIG. 5A shows how a current flows when the first capacitor C1 is discharged. FIG. 5B shows the waveform of the current flowing when the first capacitor C1 is discharged. Note that FIG. 5A shows a generative voltage on the output side as a power source Eg with the main battery 18 on the input side as a load Rg.

At t switching portion 104a to turn the first switching element SW1 on (with the sectime t1, the controller 112 applies a gate voltage to the first switching element SW1 of the firsond switching element SW2, the third switching element SW3, and the fourth switching element SW4 being off). Then, a discharge current I1 flows the following route: the first capacitor C1->the first switching element SW1->the inductor L->the load Rg->the third flywheel diode D3->the first capacitor C1. In this event, the load Rg is charged by the first capacitor C1, and magnetic energy is accumulated in the inductor L (see I1: WAVEFORM OF C1 DISCHARGE CURRENT in FIG. 5B).

Thereafter, at time t2, the controller 112 stops applying the gate voltage to the first switching element SW1 to turn the first switching element SW1 off (with the second switching element SW2, the third switching element SW3, and the fourth switching element SW4 also being off). Then, a discharge current I2 by the magnetic energy accumulated in the inductor L flows the following route: the inductor L->the load Rg->the third flywheel diode D3->the second flywheel diode D2->the inductor L (see I2: WAVEFORM OF L DISCHARGE CURRENT in FIG. 5B).

In this way, the power conversion device 100 steps down the voltage at the first capacitor C1 by returning the regenerative power charged in the first capacitor C1 to the main battery 18.

Figure 6A:
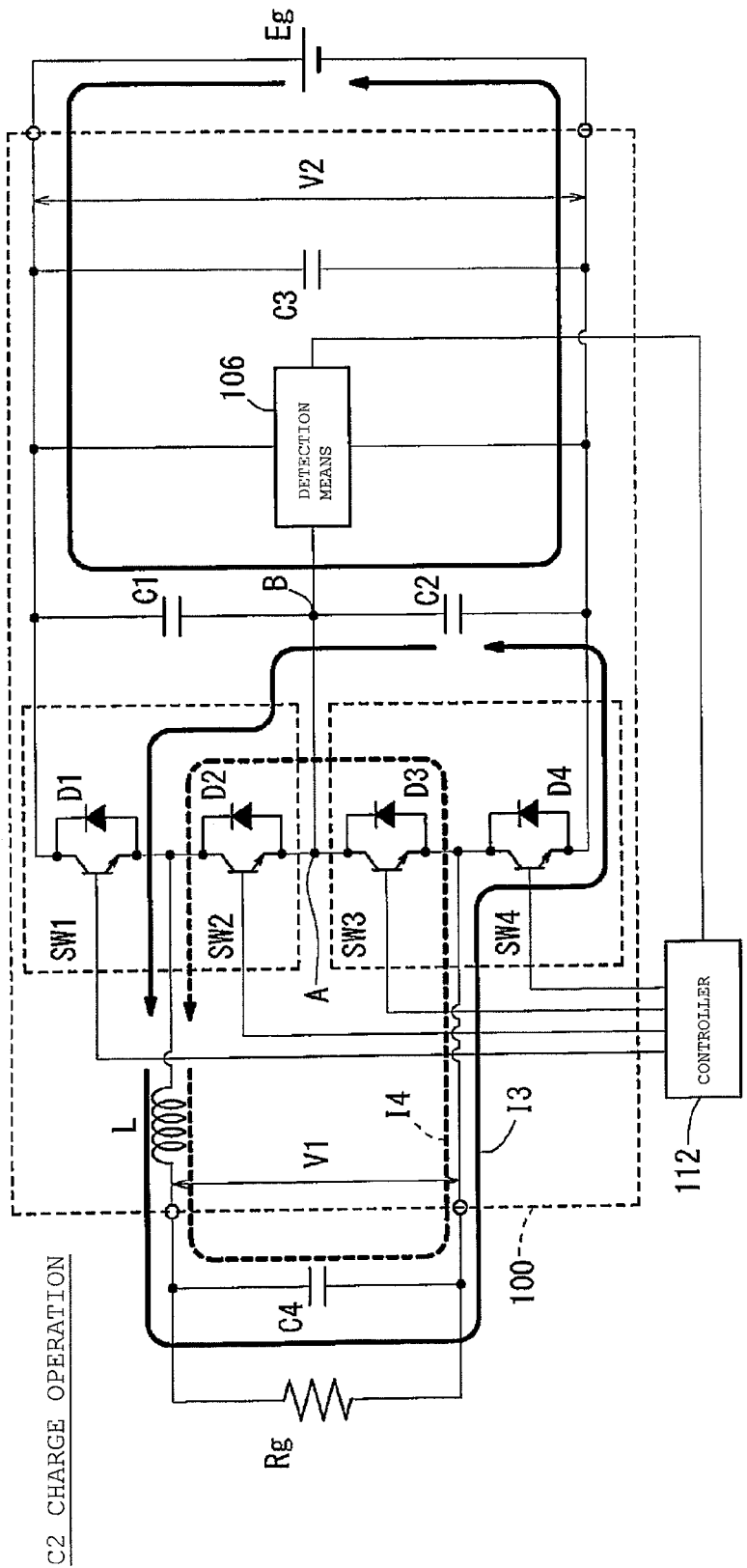
FIG. 6A shows how a current flows when the second capacitor is discharged.
Figure 6B:
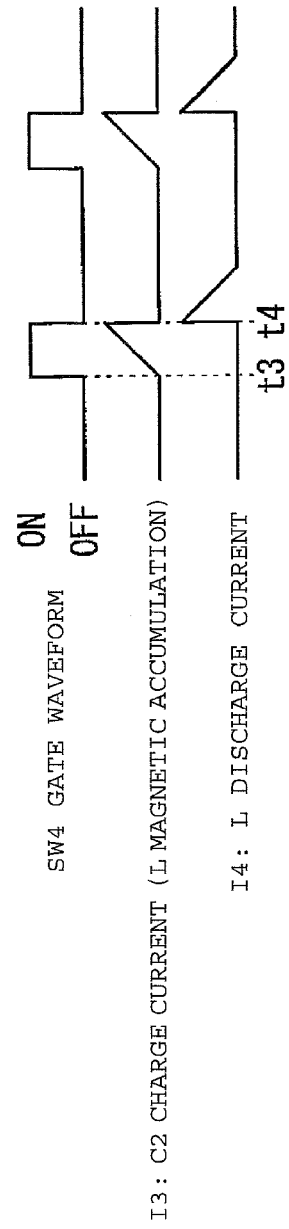
FIG. 6B shows the waveform of the current flowing when the second capacitor is discharged.

Next, a description is given of an operation of discharging the second capacitor C2 when the step-down ratio is high. FIG. 6A shows how a current flows when the second capacitor C2 is discharged, and FIG. 6B shows the waveform of the current flowing when the second capacitor C2 is discharged. Note that, like FIG. 5A, FIG. 6A shows a generative voltage on the output side as a power source Eg, and the main battery 18 on the input side as a load Rg.

At time t3, the controller 112 applies a gate voltage to the fourth switching element SW4 of the second switching portion 104b to turn the fourth switching element SW4 on (with the first switching element SW1, the second switching element SW2, and the third switching element SW3 being off). Then, a discharge current I3 flows the following route: the second capacitor C2->the second flywheel diode D2->the inductor L->the load Rg->the fourth switching element SW4->the second capacitor C2. In this event, the load Rg is charged by the second capacitor C2, and magnetic energy is accumulated in the inductor L (see I3: WAVEFORM OF C2 DISCHARGE CURRENT in FIG. 6B).

Thereafter, at time t4, the controller 112 stops applying the gate voltage to the fourth switching element SW4 to turn the fourth switching element SW4 off (with the first switching element SW 1, the second switching element SW2, and the third switching element SW3 also being off). Then, a discharge current I4 by the magnetic energy accumulated in the inductor L flows the following route: the inductor L->the load Rg->the third flywheel diode D3->the second flywheel diode D2->the inductor L (see I4: WAVEFORM OF L DISCHARGE CURRENT in FIG. 6B).

In this way, the power conversion device 100 steps down the voltage at the second capacitor C2 by returning the regenerative power accumulated in the second capacitor C2 to the main battery 18.

As described, the power conversion device 100 can step down the regenerative voltage from the motor 16 and the inverter circuit 44a connected on the output side and supply the voltage to the main battery 18, by alternately discharging the first capacitor C1 and the second capacitor C2.

Figure 7A:
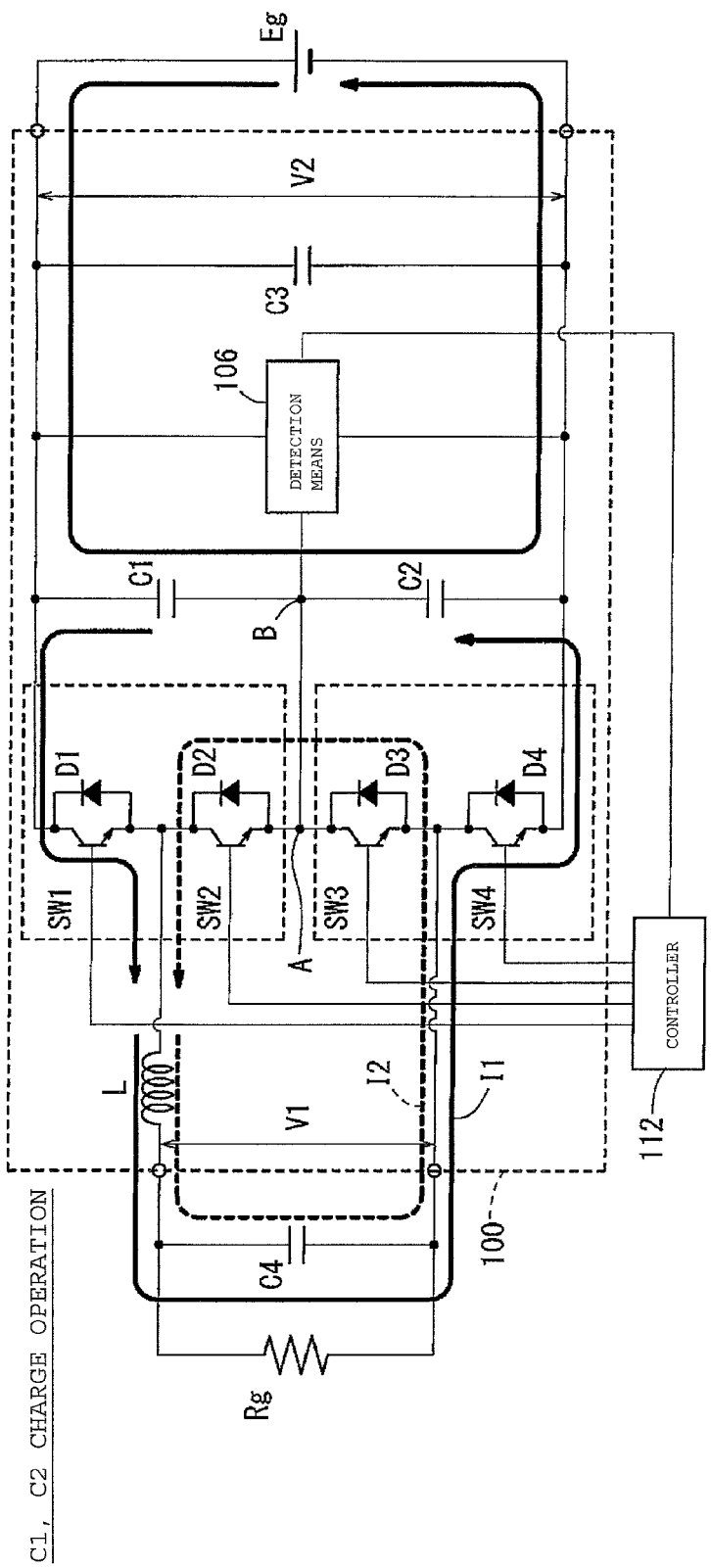
FIG. 7A shows how a current flows when the first capacitor and the second capacitor are discharged.
Figure 7B:
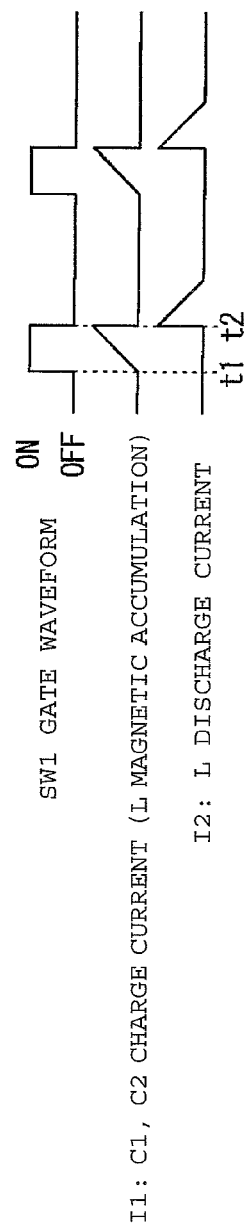
FIG. 7B shows the waveform of the current flowing when the first capacitor and the second capacitor are discharged.

Next, descriptions are given of an operation of discharging the first capacitor C1 and the second capacitor C2 when the step-down ratio is low. FIG. 7A shows how a current flows when the first capacitor C1 and the second capacitor C2 are discharged, and FIG. 7B shows the waveform of the current flowing when the first capacitor C1 and the second capacitor C2 are discharged. Note that FIG. 7A shows a generative voltage on the output side as a power source Eg with the main battery 18 on the input side as a load Rg.

In the step-down operation performed when the step-down ratio is low, the controller 112 applies a gate voltage to the first switching element SW1 and the fourth switching element SW4 to turn the fourth switching element SW4 constantly on and to turn only the first switching element SW1 on and off, while the second switching element SW2 and the third switching element SW3 are constantly off.

At time t1, the controller 112 applies a gate voltage to the first switching element SW1 of the first switching portion 104a to turn the first switching element SW1 on (with the second switching element SW2 and the third switching element SW3 being off and the fourth switching element SW4 being on). Then, a discharge current I1 flows the following route: the first capacitor C1->the first switching element SW1->the inductor L->the load Rg->the fourth switching element SW4->the second capacitor C2->the first capacitor C1. In this event, the load Rg is charged by the first capacitor C1 and the second capacitor C2, and magnetic energy is accumulated in the inductor L (see I1: WAVEFORM OF C1, C2 DISCHARGE CURRENT in FIG. 7B).

Thereafter, at time t2, the controller 112 stops applying the gate voltage to the first switching element SW1 to turn the first switching element SW1 off Then, a discharge current I2 by the magnetic energy accumulated in the inductor L flows the following route: the inductor L->the load Rg->the third flywheel diode D3->the second flywheel diode D2->the inductor L (see I2: WAVEFORM OF L DISCHARGE CURRENT in FIG. 7B).

In this way, when the step-down ratio is low (when the generative voltage is small), the power conversion device 100 can perform the regeneration by controlling the on/off of only the first switching element SW1.

Figure 8:
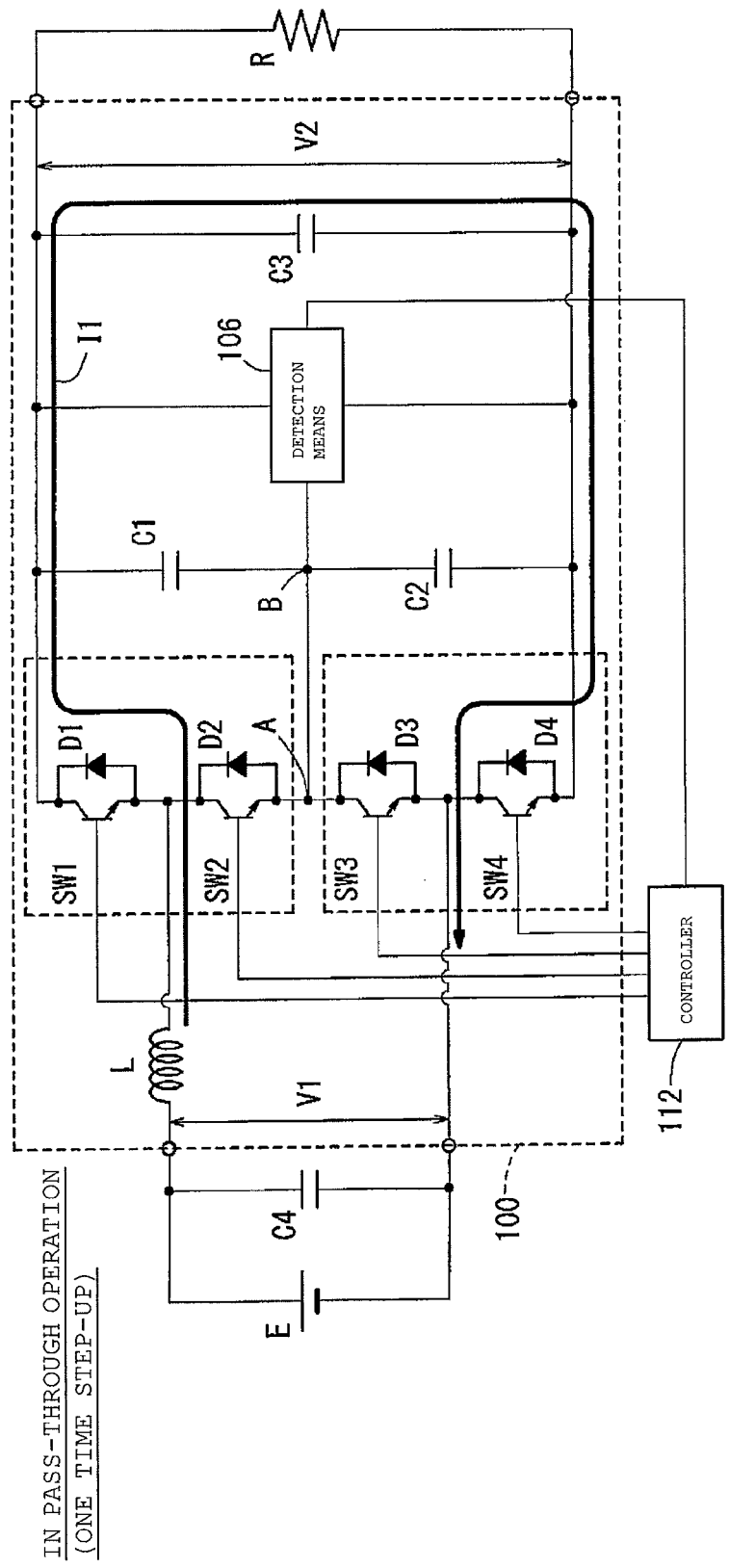
FIG. 8 shows the flow of a current in a pass-through operation.

Next, the pass-through operation is described. In the pass-through operation, the power conversion device 100 neither steps up nor steps down the voltage from the main battery 18. FIG. 8 shows the flow of a current in the pass-through operation. In the pass-through operation, all of the first switching element SW1 to the fourth switching element SW4 are constantly off.

When all of the first switching element SW1 to the fourth switching element SW4 are constantly off, a current flows the following route: the power source E->the inductor L->the first flywheel diode D1->the electric load R->the fourth flywheel diode D4->the power source E. In this case, the first capacitor C1 and the second capacitor C2 do not contribute to the step-up, and the output voltage V2 is about one time the input voltage V1. In other words, in the pass-through operation, the power conversion device 100 functions as a rectifier circuit.

Figure 9:
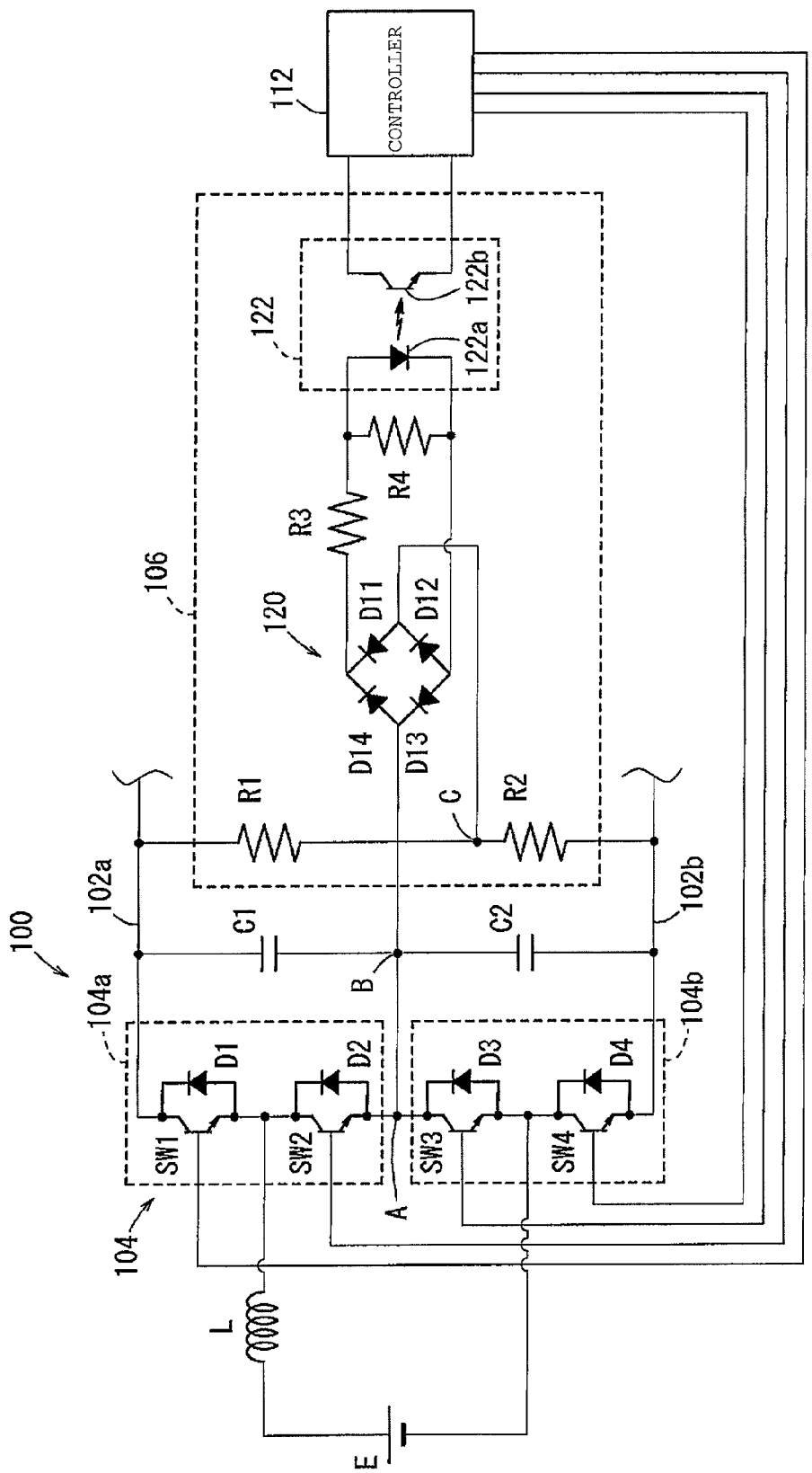
FIG. 9 is a circuit diagram of detection means.

FIG. 9 is a circuit diagram of the detection means 106. The detection means 106 has a first resistor R1 and a second resistor R2 connected in series, a diode bridge circuit 120, and a photocoupler 122.

The first resistor R1 and the second resistor R2 are provided in such a manner as to connect the positive line 102a and the negative line 102b. More specifically, the first resistor R1 is connected to the positive line 102a, while the second resistor R2 is connected to the negative line 102b. The first resistor R1 and the second resistor R2 are connected in parallel to the first capacitor C1 and the second capacitor C2 connected in series, and are provided closer to the output side than the first capacitor C1 and the second capacitor C2 are provided.

The diode bridge circuit 120 has a diode D11, a diode D12, a diode D13, and a diode D14. The diode D12 and the diode D13 are connected to each other at their anodes, and the diode D11 and the diode D14 are connected to each other at their cathodes. Further, the cathode of the diode D12 is connected to the anode of the diode D11, and the cathode of the diode D13 is connected to the anode of the diode D14.

The connection node between the diode D11 and the diode D12 is connected to connection node C between the first resistor R1 and the second resistor R2, while the connection node between the diode D13 and the diode D14 is connected to the connection node B between the first capacitor C1 and the second capacitor C2. The connection node between the diode D11 and the diode D14 and the connection node between the diode D12 and the diode D13 are connected to the photocoupler 122.

The photocoupler 122 has a light-emitting diode 122a as light-emitting means for emitting light and a phototransistor 122b as light-receiving means for receiving the light. The connection node between the diode D11 and the diode D14 is connected to the anode of the light-emitting diode 122a via a third resistor R3, and the connection node between the diode D12 and the diode D13 is connected to the cathode of the light-emitting diode 122a. Moreover, a fourth resistor R4 is connected in parallel to the light-emitting diode 122a and is provided between the diode bridge circuit 120 and the light-emitting diode 122a. The light-emitting diode 122a emits light of an intensity corresponding to the amount of currents flowing therethrough, and the phototransistor 122b passes a current according to the intensity of the light emitted by the light-emitting diode 122a. Accordingly, the larger the current flowing through the light-emitting diode 122a, the larger the amount of current flowing through the phototransistor 122b.

Next, a description is given of an operation the detection means 106 performs when the first capacitor C1 and the second capacitor C2 are short-circuited. The first capacitor C1 and the second capacitor C2 are short-circuited in a situation such as when an excess voltage is applied. The detection means 106 detects a short circuit of the first capacitor C1 and the second capacitor C2 during the step-up operation. The operation of the detection means 106 is different between when the first capacitor C1 is short-circuited and when the second capacitor C2 is short-circuited.

Figure 10A:
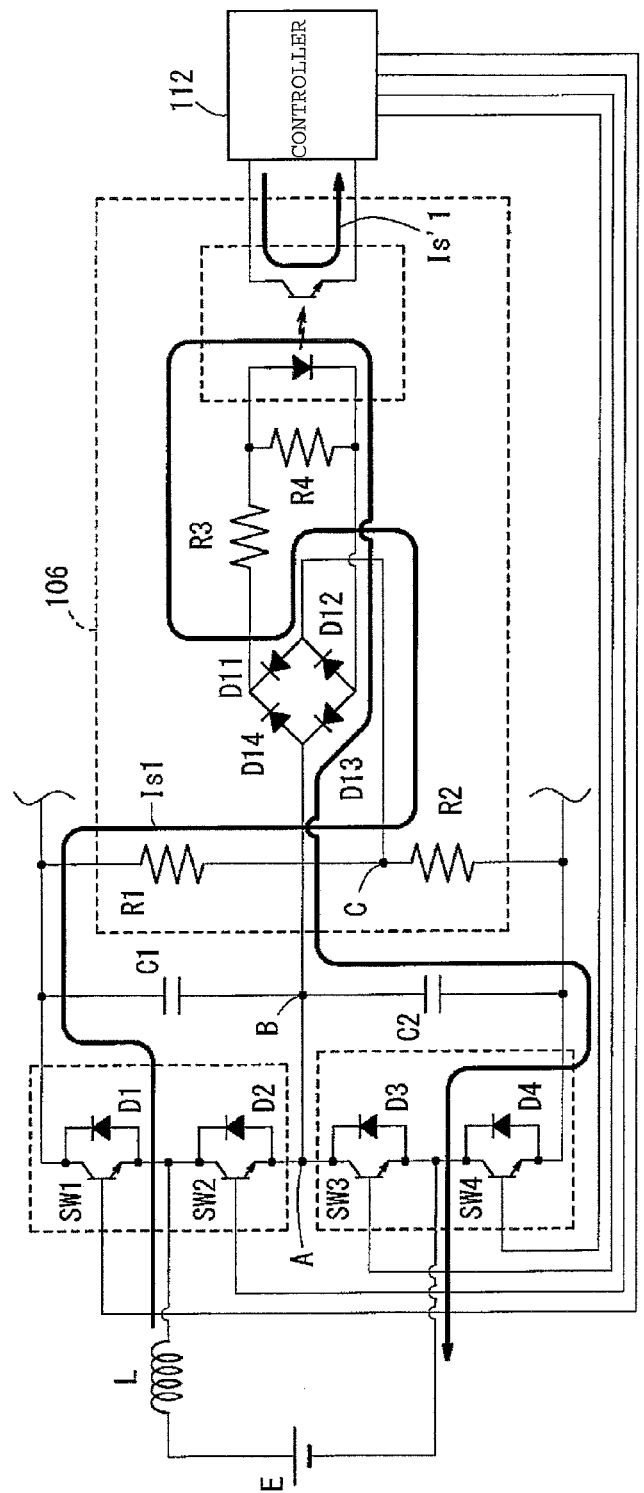
FIG. 10A shows how a current flows through the detection means when the second capacitor of the power conversion device operating in the step-up mode is short-circuited.
Figure 10B:
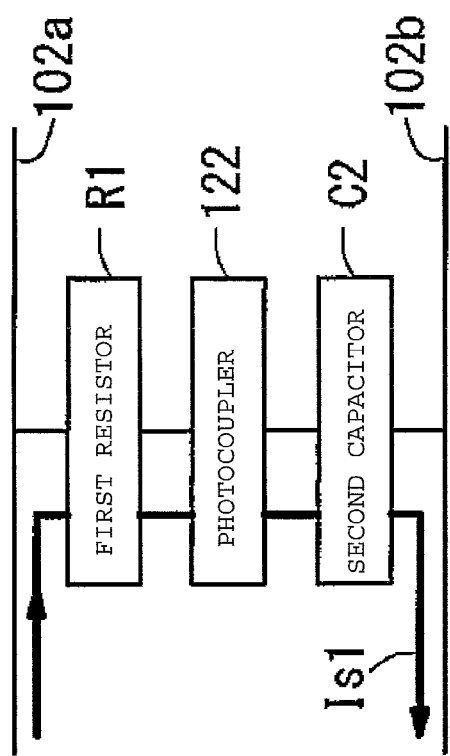
FIG. 10B is a diagram schematically showing the flow route of the current in FIG. 10A.

FIG. 10A shows how a current Is1 flows through the detection means 106 when the second capacitor C2 of the power conversion device 100 operating in the step-up mode is short-circuited. FIG. 10B is a diagram schematically showing the flow route of the current Is1 in FIG. 10A. Note that FIG. 10A shows the main battery 18 as a power source E.

As shown in FIG. 10A, when the second capacitor C2 is short-circuited and when all of the first switching element SW1 to the fourth switching element SW4 are off in the step-up operation, the current Is1 flows the following route: the power source E->the inductor L->the first flywheel diode D1->the first resistor R1->the diode D11->the third resistor R3->the light-emitting diode 122a->the diode D13->the second capacitor C2 (short-circuited)->the fourth flywheel diode D4->the power source E. In this event, the light-emitting diode 122a emits light when the current Is1 flows therethrough, and accordingly, a current Is'1 flows through the phototransistor 122b. Receiving the current Is'1 (light-emission information) flowing from the phototransistor 122b, the controller 112 can determine that either the first capacitor C1 or the second capacitor C2 is short-circuited.

More specifically, as shown in FIG. 10B, the first resistor R1 and the photocoupler 122 are provided between the positive line 102a and the negative line 102b in such a manner as to be connected in series to the second capacitor C2. In other words, a closed circuit is formed by the positive line 102a, the first resistor R1, the photocoupler 122, the second capacitor C2, and the negative line 102b. Accordingly, when the second capacitor C2 is short-circuited, the current Is1 can flow through the photocoupler 122. Thereby, when the second capacitor C2 is short-circuited, the photocoupler 122 can detect (inform) that either the first capacitor C1 or the second capacitor C2 is short-circuited.

Figure 11A:
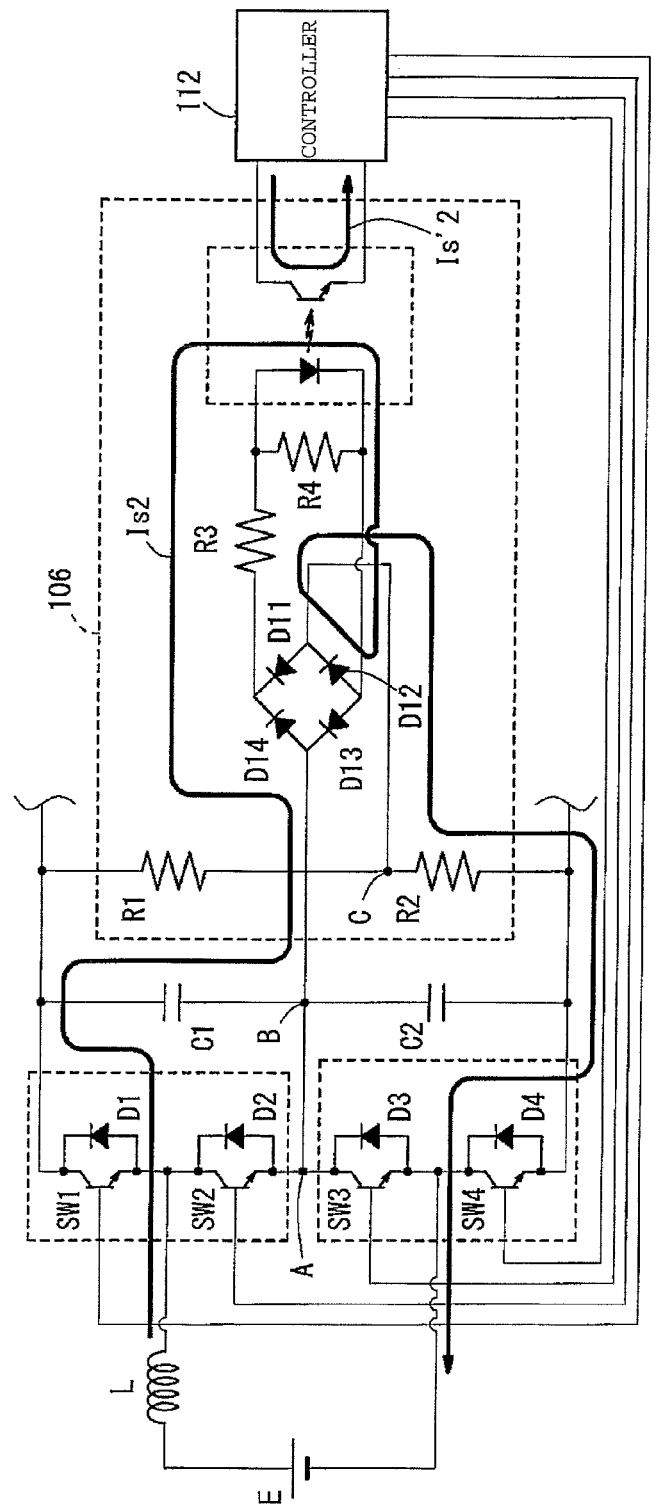
FIG. 11A shows how a current flows through the detection means when the first capacitor of the power conversion device operating in the step-up mode is short-circuited.
Figure 11B:
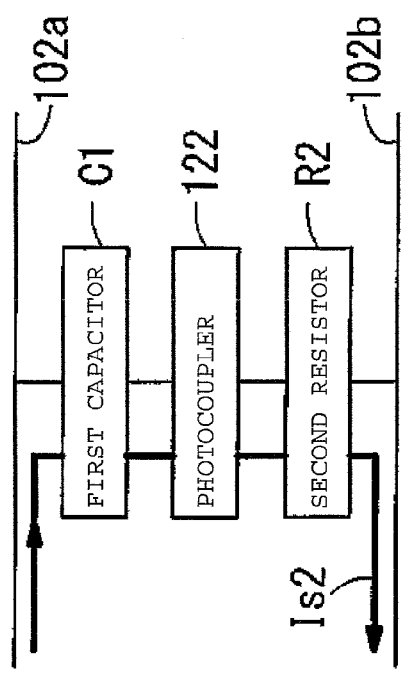
FIG. 11B is a diagram schematically showing the flow route of the current in FIG. 11A.

FIG. 11A shows how a current Is2 flows through the detection means 106 when the first capacitor C1 of the power conversion device 100 operating in the step-up mode is short-circuited. FIG. 11B is a diagram schematically showing the flow route of the current Is2 in FIG. 11A. Note that FIG. 11A shows the main battery 18 as a power source E.

As shown in FIG. 11A, when the first capacitor C1 is short-circuited and when all of the first switching element SW1 to the fourth switching element SW4 are off in the step-up operation, the current Is2 flows the following route: the power source E->the inductor L->the first flywheel diode D1->the first capacitor C1 (short-circuited)->the diode D14->the third resistor R3->the light-emitting diode 122a->the diode D12->the second resistor R2->the fourth flywheel diode D4->the power source E. In this event, the light-emitting diode 122a emits light when the current Is2 flows therethrough, and accordingly, a current Is'2 flows through the phototransistor 122b. Receiving the current Is'2 (light-emission information) flowing from the phototransistor 122b, the controller 112 can determine that either the first capacitor C1 or the second capacitor C2 is short-circuited.

More specifically, as shown in FIG. 11B, the photocoupler 122 and the second resistor R2 are provided between the positive line 102a and the negative line 102b in such a manner as to be connected in series to the first capacitor C1. In other words, a closed circuit is formed by the positive line 102a, the first capacitor C1, the photocoupler 122, the second resistor R2, and the negative line 102b. Accordingly, when the first capacitor C1 is short-circuited, the current Is2 can flow through the photocoupler 122. Thereby, when the first capacitor C1 is short-circuited, the photocoupler 122 can detect (inform) that either the first capacitor C1 or the second capacitor C2 is short-circuited.

When the detection means 106 detects a short circuit of the first capacitor C1 or the second capacitor C2, the controller 112 sets the operation to the pass-through operation to stop stepping up or stepping down the voltage. In other words, the controller 112 turns off all the first switching element SW1 to the fourth switching element SW4. This makes the output voltage equal to the input voltage. Note that, when a short circuit of the first capacitor C1 or the second capacitor C2 is detected, the controller 112 may inform the driver of the electric motorcycle 10 of the short-circuit detection by lighting an indicator lamp (not shown). Alternatively, the driver of the electric motorcycle 10 may be informed of the short-circuit detection by an indication on a display part (not shown) such as a liquid crystal display or by a sound outputted from a loudspeaker.

As described, the power conversion device 100 is provided with the detection means 106 that is connected in series to the first capacitor C1 and the second capacitor C2 and is configured to detect (inform) that either the first capacitor C1 or the second capacitor C2 is short-circuited. Accordingly, even when small short-circuit capacitors are used, in the event of a short circuit, a closed circuit is formed between the power lines 102 by the first capacitor C1 or the second capacitor C2 and the detection means 106 to allow the detection means 106 to inform of the short-circuit. No special member such as a voltage detector is necessary. Thus, a power conversion device 100 suitable for a small electric vehicle can be provided.

Further, since the detection means 106 has the light-emitting diode 122a configured to emit light when the first capacitor C1 and the second capacitor C2 are short-circuited and the phototransistor 122b configured to receive the light emitted by the light-emitting diode 122a, the phototransistor 122b and the light-emitting diode 122a can be grounded separately.

Moreover, since the light-emitting diode 122a and the phototransistor 122b are configured by the photocoupler 122, the detection means 106 can be configured inexpensively. Since the controller 112 receives the light-emission information from the light-emitting diode 122a, the controller 112 which is a low-voltage system and the circuit (the main battery 18, the inductor L, the switching means 104, the first capacitor C1, the second capacitor C2, the third capacitor C3, and the diode bridge circuit 120) which is a high-voltage system can be separately grounded.

The detection means 106 has the diode bridge circuit 120 via which the light-emitting diode 122a is connected in series to the first capacitor C1 and the second capacitor C2. Accordingly, even when the power conversion device 100 includes multiple capacitors, a short circuit of each capacitor can be detected.

When detected by the detection means 106 of a short circuit of either the first capacitor C1 or the second capacitor C2, the controller 112 stops stepping up or stepping down the voltage. However, the current can flow in both directions. Accordingly, the electric load R can be supplied with a minimum necessary voltage, and therefore a limp home mode can be performed.

The present invention has been described above using the preferred embodiment, but the technical scope of the present invention is not limited to what is described in the embodiment given above. It is apparent to those skilled in the art that the above embodiment can be modified or improved variously. As is clear from the scope of claims, the technical scope of the present invention can include modes obtained by such modifications and improvements, as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power conversion device in an electric vehicle, the power conversion device comprising:
   an inductor connected on a battery side;
   switching means provided between the inductor and a power line;
   the power line connecting a first capacitor and a second capacitor and an electric load in parallel; and control means for Controlling on/off of the switching means so as to step up power from the battery and supply the power to the electric load or so as to step down power from the electric load and supply the power to the battery;
   wherein the first and second capacitors are configured to be short-circuited upon application of an excess voltage; and
   the power conversion device further comprises informing means for informing of a short circuit of the first and second capacitors, the informing means being connected in series to the capacitor.

2. The power conversion device in an electric vehicle according to claim 1, wherein the informing means includes light-emitting means for emitting light when the first and second capacitors are short-circuited, and light-receiving means for receiving the light emitted by the light-emitting means.

3. The power conversion device in an electric vehicle according to claim 2, wherein the light-emitting means and the light-receiving means are configured by a photocoupler.

4. The power conversion device in an electric vehicle according to claim 2, wherein the control means receives light-emission information from the light-emitting means.

5. The power conversion device in an electric vehicle according to claim 3, wherein the control means receives light-emission information from the light-emitting means.

6. The power conversion device in an electric vehicle according to claim 2, wherein:
   the informing means includes a diode bridge circuit; and
   the light-emitting means is connected in series to the first and second capacitors via the diode bridge circuit.

7. The power conversion device in an electric vehicle according to claim 3, wherein:
   the informing means includes a diode bridge circuit; and.
   the light-emitting means is connected in series to the first and second capacitors via the diode bridge circuit.

8. The power conversion device in an electric vehicle according to claim 4, wherein:
   the informing means includes a diode bridge circuit; and
   the light-emitting means is connected in series to the first and second capacitors via the diode bridge circuit.

9. The power conversion device in an electric vehicle according to claim 1, wherein the control means stops stepping up or stepping down the power when informed by the informing means that the first and second capacitors are short-circuited.

10. The power conversion device in an electric vehicle according to claim 2, wherein the control means stops stepping up or stepping down the power when informed by the informing means that the first and second capacitors are short-circuited.

11. The power conversion device in an electric vehicle according to claim 3, wherein the control means stops stepping, up or stepping down the power when informed by the informing means that the first and second capacitors are short-circuited.

12. The power conversion device in an electric vehicle according to claim 4, wherein the control means stops stepping up or stepping down the power when informed by the informing means that the first and second capacitors are short-circuited.

13. The power conversion device in an electric vehicle according to claim 6, wherein the control means stops stepping up or stepping down the power when informed by the informing means that the first and second capacitors are short-circuited.

14. A power conversion device for use in an electric vehicle, the power conversion device comprising:
   an inductor connected;
   switching means operatively connected between the inductor and a power line;
   a first capacitor and a second capacitor and an electric load being operatively disposed in parallel along the power line;
   control means for controlling on/off of the switching means so as to step up power from a battery and supply the power to the electric load or so as to step down power from the electric load and supply the power to the battery;
   wherein the first and second capacitors are configured to be short-circuited upon application of an excess voltage; and
   informing means for informing of a short circuit of the first and second capacitor, the informing means being operatively connected to the power conversion device and being connected in series to the first and second capacitor.

15. The power conversion device for use in an electric vehicle according to claim 14, wherein the informing means includes light-emitting means for emitting light when the first and second capacitors are short-circuited, and light-receiving means for receiving the light emitted by the light-emitting means.

16. The power conversion device for use in an electric vehicle according to claim 15, wherein the light-emitting means and the light-receiving means are configured by a photocoupler.

17. The power conversion device for use in an electric vehicle according to claim 15, wherein the control means receives light-emission information from the light-emitting means.

18. The power conversion device for use in an electric vehicle according to claim 15, wherein:

the informing means includes a diode bridge circuit; and
the light-emitting means is connected in series to the first and second capacitor via the diode bridge circuit.

19. The power conversion device for use in an electric vehicle according to claim 14, wherein the control means stops stepping up or stepping down the power when informed by the informing means that the first and second capacitors are short-circuited.

20. The power conversion device in an electric vehicle according to claim 15, wherein the control means stops stepping up or stepping down the power when informed by the informing means that the first and second capacitors are short-circuited.

* * * * *

UNITED STATES PATENT AND TRADEMARK OFFICE
CERTIFICATE OF CORRECTION

PATENT NO. : 9,327,658 B2
APPLICATION NO. : 13/900713
DATED : May 3, 2016
INVENTOR(S) : Yasuto Watanabe et al.

It is certified that error appears in the above-identified patent and that said Letters Patent is hereby corrected as shown below:

IN THE CLAIMS:

In claim 1, at column 13, line 40, change "capacitor" to --first and second capacitors--.

In claim 14, at column 14, lines 48 and 50-51, change "capacitor" to --capacitors--.

In claim 18, at column 15, line 3, change "capacitor" to --capacitors--.

Signed and Sealed this
Twelfth Day of July, 2016

Michelle K. Lee
*Director of the United States Patent and Trademark Office*